(No Model.)

E. C. ATKINS.
BAND SAW MILL.

No. 342,416. Patented May 25, 1886.

WITNESSES.
Chas. N. Leonard.
Charles L. Thurber.

INVENTOR.
Elias C. Atkins,
PER
C. Bradford.
ATTORNEY.

N. PETERS, Photo-Lithographer, Washington, D. C.

UNITED STATES PATENT OFFICE.

ELIAS C. ATKINS, OF INDIANAPOLIS, INDIANA.

BAND-SAW MILL.

SPECIFICATION forming part of Letters Patent No. 342,416, dated May 25, 1886.

Application filed February 23, 1886. Serial No. 192,867. (No model.)

*To all whom it may concern:*

Be it known that I, ELIAS C. ATKINS, of the city of Indianapolis, county of Marion, and State of Indiana, have invented certain new and useful Improvements in Guiding and Retaining Wheels for Saws, of which the following is a specification.

In band-saw-mills it has heretofore been necessary to provide guides or guide-rollers to prevent the saw from being crowded off the wheels over which it runs by the strain and pressure incident to the work. I have discovered that they can be held in position by applying convex wheels to the sides of the saw, and the guides, which have heretofore been arranged to bear against their back edges, be thus dispensed with.

My invention consists, therefore, in the application of convex wheels to band saws for the purposes indicated.

It further consists in the combination, with crown or convex-surfaced pulleys, of saws formed correspondingly concave or thinner in the middle than at the edges.

Figure 1:
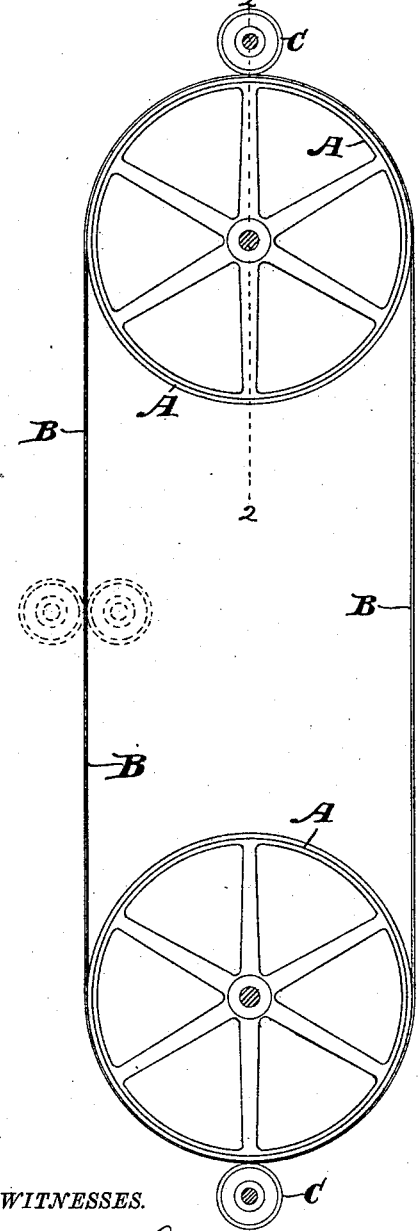
Figure 2:
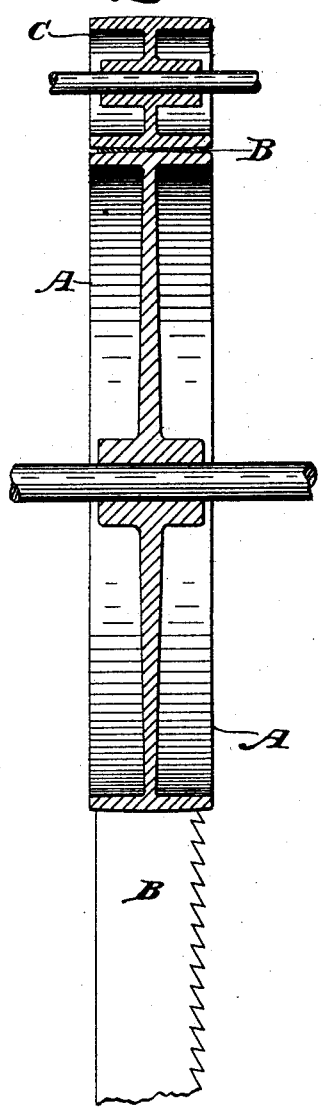

Referring to the accompanying drawings, which are made a part hereof, and on which similar letters of reference indicate similar parts, Figure 1 is a side elevation of a band-saw upon its wheels and with my guiding and retaining wheels applied; and Fig. 2 is a central vertical section on an enlarged scale on the dotted lines 2 2 in Fig. 1.

In said drawings the portions marked A represent the band-saw wheels, B the band-saw, and C my guiding and retaining wheels.

The band-saw wheels A are somewhat convexed or crowning, as is usual and desirable in mills of this character.

The band-saw B is of the character shown and described in my pending application No. 192,075, for Letters Patent, being concave or thinner in the middle than at the edges. However, I do not desire to be limited in my present invention to such saws, as the wheels are applicable to any band-saw mills.

The guiding and retaining wheels C are shown as resting upon the saw above and below the wheels over which the saw runs, thus clamping said saw between its wheels and these guiding and retaining wheels. I do not, however, desire to be limited to this location, as it is entirely practicable to arrange one or two of these guiding and retaining wheels at a point between the wheels which carry the saw, as indicated by dotted lines in Fig. 1, and also made adjustable, if desired, and when so arranged, with one upon each side of the saw, are equally as effective as when arranged as shown, and I desire to be understood as claiming convex-surfaced wheels, broadly, when applied to band-saws for the purpose of guiding and retaining them in position.

Having thus fully described my said invention, what I claim as new, and desire to secure by Letters Patent, is—

1. The combination of the band-saw, band-saw wheels carrying the same, and convex-surfaced guiding and retaining wheels, substantially as shown and described, and for the purposes specified.

2. The combination, with a band-saw thinner in the middle than at the edges, of convex-surfaced guiding and retaining wheels, substantially as shown and described.

3. The combination, with a band-saw, of convex-surfaced wheels bearing oppositely upon the saw on its sides for guiding and retaining said saw, substantially as set forth.

4. The combination, with pulleys crowned or having convex surfaces, of a saw formed correspondingly concave.

In witness whereof I have hereunto set my hand and seal, at Indianapolis, Indiana, this 18th day of February, A. D. 1886.

ELIAS C. ATKINS. [L. S.]

In presence of—
C. BRADFORD,
CHARLES L. THURBER.